United States Patent
Cama et al.

[11] Patent Number: 5,933,670
[45] Date of Patent: Aug. 3, 1999

[54] FOCAL PLANE MOUNTING FOR AN IMAGE SENSOR

[75] Inventors: David M. Cama, Macedon; Anthony G. Chinnici, Rochester, both of N.Y.

[73] Assignee: Eastman Kodak Company, Rochester, N.Y.

[21] Appl. No.: 08/994,003

[22] Filed: Dec. 18, 1997

[51] Int. Cl.⁶ .................................................. G03B 17/24
[52] U.S. Cl. .......................... 396/429; 396/535; 348/64
[58] Field of Search ............................ 348/64; 396/429, 396/535

[56] References Cited

U.S. PATENT DOCUMENTS

| | | | |
|---|---|---|---|
| 4,410,254 | 10/1983 | Niemuth et al. | 354/203 |
| 5,452,000 | 9/1995 | Sapir | 348/207 |
| 5,483,284 | 1/1996 | Ishiguro | 348/335 |
| 5,600,385 | 2/1997 | Takeshita | 396/319 |
| 5,627,589 | 5/1997 | Ejima et al. | 348/340 |

FOREIGN PATENT DOCUMENTS

| | | | |
|---|---|---|---|
| 61-245773 | 11/1986 | Japan | H04N 5/225 |
| 5-150360 | 6/1993 | Japan | G03B 17/56 |

*Primary Examiner*—David M. Gray
*Attorney, Agent, or Firm*—David M. Woods

[57] ABSTRACT

A camera includes a lens arranged on an optical axis for focusing an image upon a focal plane bounded by rails that define a reference for locating an imaging medium relative to the focal plane, an electronic image sensor, and an imager mounting plate supporting the image sensor against the rails in the focal plane. By including on one or more of the rails a plurality of alignment holes that are precisely located relative to the optical axis, and a like plurality of locating pins on the imager mounting plate, the pins on the mounting plate locate into the corresponding holes in the film rails to center the image sensor with respect to the optical axis at the focal plane.

4 Claims, 2 Drawing Sheets

FOCAL PLANE MOUNTING FOR AN IMAGE SENSOR

FIELD OF THE INVENTION

The invention relates generally to the field of electronic photography, and in particular to techniques for aligning an image sensor to an optical axis of an electronic camera.

BACKGROUND OF THE INVENTION

High resolution digital cameras have been developed for professional photographers, whose business depends on taking high quality pictures. These cameras often use existing 35 mm or medium-format film camera bodies and lenses, together with a customized electronic imaging back that replaces the removable film back ordinarily supplied with the camera. An example is the Kodak DCS 460 camera, which is based upon the Nikon N90s single lens reflex (SLR) camera body. This system, which is compatible with all Nikon lenses and accessories, allows photographers to easily operate the digital camera, and to use their existing equipment with the camera. However, the photosensitive area of the imager is often smaller than the film area, and therefore smaller than the image plane. As a result, the relative magnification of the lens is larger than for 35 mm film.

A problem with this type of camera is the alignment of the image sensor to the optical axis of the camera body. For a non-SLR camera, where the sensor may be an integral part of an optical assembly, the alignment technique in Japanese patent application 61-245773 can be used. Two positioning pins are provided to the rear end of a lens barrel, and are pressed into contact with a ceramic package containing the image sensor in order to optically position the image sensor at an image plane of a lens assembly. However, in an SLR camera system, the image sensor cannot physically locate to the lens assembly because the lens, which is removable, is separated from the image plane by a movable mirror used for through-the-lens viewing.

Consequently, in a camera back system using a film body, the sensor needs to be referenced to the film plane. For example, as shown in U.S. Pat. No. 5,483,284, a CCD package possesses four positioning pins at four corners thereof that touch a guide rail plane of an aperture in the camera body. With this arrangement, the CCD package is precisely located at the focal plane of the lens assembly, i.e., in the z dimension. However, it is difficult to prevent x-y misalignment, which in turn prevents accurate centering of the CCD package relative to the optical axis of the lens assembly.

Because the photosensitive area of the imager is often smaller than the optical image plane in the camera, which is designed for 35 mm film, the viewfinder image area likewise needs to be reduced in size to match the imager area. This is ordinarily done by masking over the non-captured region of the viewfinder image. Customers of professional digital back cameras, however, are demanding improved accuracy in representation of the captured image center relative to the camera viewfinder. The above-mentioned '284 patent does not provide accurate centering of the image sensor relative to the optical axis of the camera. What is needed is a reliable method for optical centering of the imager in an SLR system.

SUMMARY OF THE INVENTION

The present invention is directed to overcoming one or more of the problems set forth above. Briefly summarized, according to one aspect of the present invention, a camera includes a lens arranged on an optical axis for focusing an image upon a focal plane bounded by rails that define a reference for locating an imaging medium relative to the focal plane. The camera also includes an electronic image sensor, and an imager mounting plate supporting the image sensor against the rails in the focal plane. By including on one or more of the rails a plurality of alignment holes which are precisely located relative to the optical axis, and a like plurality of locating pins on the imager mounting plate, the pins on the mounting plate locate into the corresponding holes in the rails to center the image sensor with respect to the optical axis at the focal plane.

The advantage of this invention is particularly seen in a single lens reflex camera of the type used to capture film images, wherein an optical section is arranged on an optical axis including a movable mirror for directing image light toward a viewfinder. Because the image sensor is smaller than the area of the focal plane, only a central region of the viewfinder image corresponds to the captured image. The locating pins locate into the corresponding holes in the rails to center the image sensor with respect to the optical axis at the focal plane so that the captured image is centered with respect to the viewfinder image.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Because imaging devices employing electronic sensors are well known, as are single lens reflex cameras and related components, the present description will be directed in particular to elements forming part of, or cooperating more directly with, apparatus in accordance with the present invention. Elements not specifically shown or described herein may be selected from those known in the art.

Figure 1:
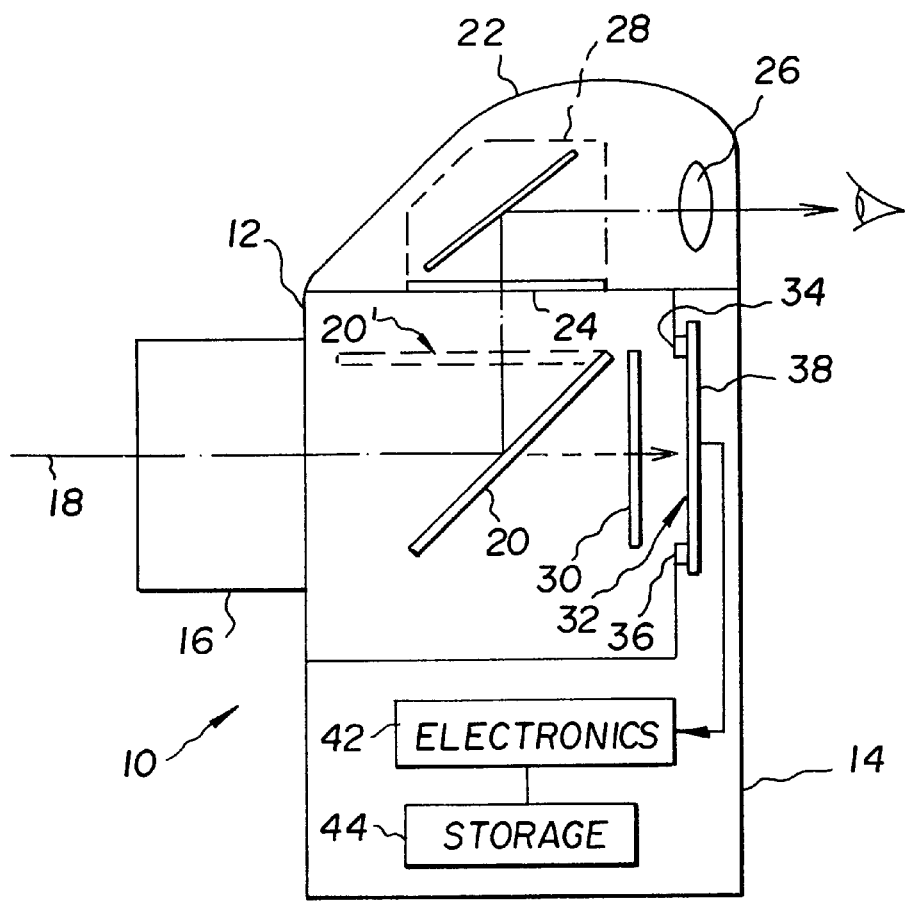
FIG. 1 is a schematic view of the camera according to the invention, showing a back enclosure attached to a camera body.
Figure 2:
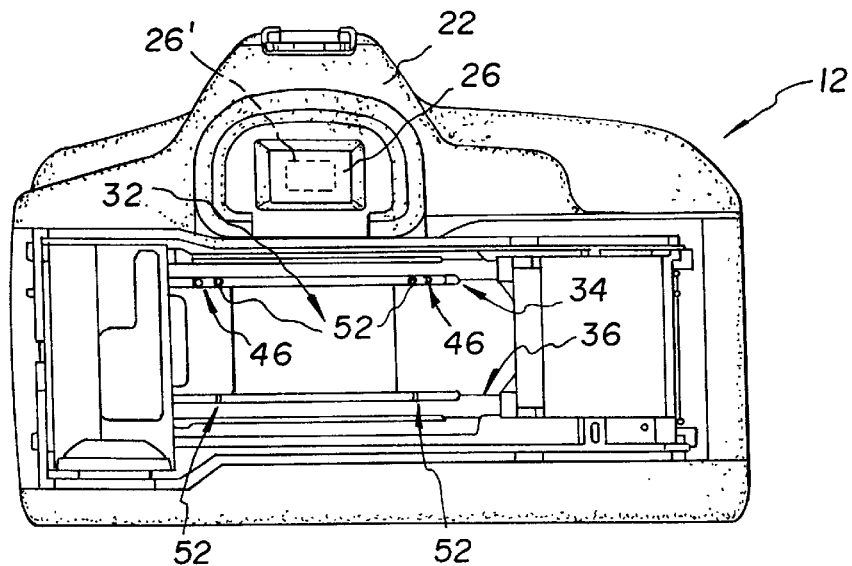
FIG. 2 is a rear view of the type of camera shown in FIG. 1 with the back enclosure removed.

Beginning with FIG. 1, a digital camera 10 is shown mainly in schematic form to include a body component 12 and a back enclosure 14. Although the camera 10 is a fully integrated unit, in the sense that the back enclosure 14 is not intended to be removable by the photographer, the body component 12 is a conventional 35 mm single lens reflex (SLR) film camera body, such as a Canon EOS-1n film camera body. FIG. 2 shows a rear view of the body component 12, as would be seen during the assembly operation. Referring to FIGS. 1 and 2 together as appropriate, the body component 12 includes a lens 16, typically interchangeable, for directing image light along an optical axis 18 toward a pivotable mirror 20. When the mirror 20 is in its down position as shown in FIG. 2, the image light is directed upward to an optical viewfinder 22. A viewfinder image, which is formed on a focusing screen 24, is viewed through an eyepiece 26 and a prism 28. When the pivotable mirror 20 is raised to the position 20', the image light is directed through a focal plane shutter 30 and forms an image on a focal plane 32. The focal plane is bounded on two sides by a pair of rails 34 and 36. Recalling that the body component 12 is a film camera body, the rails 34,36 are of the type that are used in a film camera to support a film in the focal plane 32.

In the digital camera 10, an imager mounting plate 38 (see also FIG. 3) supports a charge coupled device (CCD) image sensor 40 in a central region thereof. As shown in FIG. 4, electrical contacts 39 extend from the plate 38. The imager mounting plate 38 is supported against the rails 34,36 so that the charge-coupled device (CCD) image sensor 40 is positioned along the optical axis 18 in the focal plane 32. The image data captured by the image sensor 40 is transferred via the contacts 39 to an electronics section 42, which includes conventional circuitry and processors for analog processing, analog to digital conversion, digital signal processing, and the like. The captured image data is then stored in a conventional storage section 44, which may incorporate a conventional interface (e.g., a PCMCIA interface) to a memory card or a hard drive card.

Figure 3:
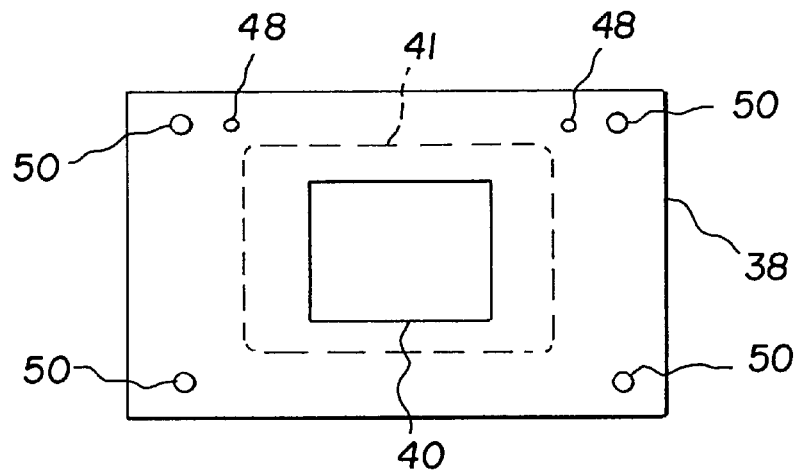
FIG. 3 is a front view of an imager mounting plate of the type used with the camera shown in FIGS. 1 and 2.
Figure 4:
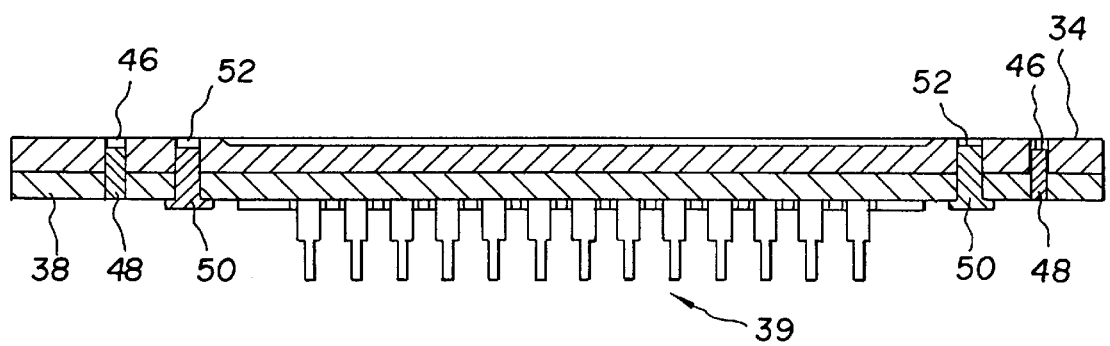
FIG. 4 is a view showing details of the alignment of the imager mounting plate to the rails of the camera body.

As shown in FIG. 3, the image sensor 40 presents a smaller area than a 35 mm film frame (shown as a dotted frame 41) to the focal plane 32. Therefore, there is a lens magnification or telephoto effect present in the camera. Compared to a 35 mm frame (typically 24 mm×36 mm), the image sensor 40 will have, in a typical embodiment, dimensions of about 15 mm×22 mm, to provide a lens magnification factor of about 1.6 (compared to 1.0 for a 35 mm frame). Importantly for this invention, the region of the image that is captured does not occupy the full area of the focusing screen 24, as would be the case with a 35 mm image. Consequently, a finder mask 26' (shown in FIG. 2) is installed in the camera viewfinder 22 in order to mask off the portion of the focusing screen 24 which is not included in the actual picture area of the image sensor 40. Because the viewfinder image is physically decoupled from the actual location of the active image area of the image sensor 40, an error in the location of the imager mounting plate 38 against the rails 34,36—although not affecting the plane of focus—will affect the centering of the captured image relative to the viewfinder image. What the user sees through the mask 26 in the viewfinder 22 may therefore fail to coincide with what is captured by the image sensor 40.

Given the complexity of accurately locating an image sensor relative to the optical axis 18 of an SLR film camera, the following technique is utilized according to the invention: Precisely dimensioned and located alignment holes 46 are added to the film rail 34 of the SLR camera body 12. The alignment holes 46 are the locating features for a like number of precisely machined pins 48 in the imager mounting plate 38. The alignment holes 46 precisely position the pins 48 relative to the optical axis 18. During the assembly process, the image sensor 40 is placed within the imager mounting plate 38 relative to the pins 48 to extremely precise dimensions. This can be done, e.g., by optically referencing features on the image sensor chip to the location of the pins 48 such that the center of the image sensor 40 is precisely defined relative to the optical axis 18. Then, the assembly of the imager mounting plate 38 to the rails 34,36 via pin 48 engagement with the alignment holes 46 accurately locates the image sensor 40 on the optical axis 18 of the camera 10. More specifically, the image sensor 40 is accurately centered with regard to the optical axis 18 so that the masked area 26' of the viewfinder image coincides with the active area of the image sensor 40 and the user may accordingly be assured that what is seen through the masked area 26' of the viewfinder 22 is substantially equivalent to the image captured. The imager mounting plate 38 is retained to the body component 12 by fasteners 50 such as screws which utilize tapped holes 52 in the film rails 34,36.

The invention has been described with reference to a preferred embodiment. However, it will be appreciated that variations and modifications can be effected by a person of ordinary skill in the art without departing from the scope of the invention. For example, although the alignment holes 46 are shown formed on one rail 34, one hole 46 could be formed in each of the rails 34,36, or both holes 46 could be in the rail 36. In each case, the pins 48 would be correspondingly located on the imager mounting plate 38.

PARTS LIST 10 digital camera
12 body component
14 back enclosure
16 lens
18 optical axis
20 pivotable mirror
22 optical viewfinder
24 focusing screen
26 eyepiece
26' mask
28 prism
30 focal plane shutter
32 focal plane
34 rail
36 rail
38 imager mounting plate
40 image sensor
41 dotted frame
42 electronics section
44 storage section
46 alignment holes
48 pins
50 fasteners
52 tapped holes

What is claimed is:

1. In a camera having a body component including a lens arranged on an optical axis for focusing an image upon a focal plane bounded by rails that define a reference for locating an imaging medium relative to the focal plane, the camera including an electronic image sensor and an imager mounting plate supporting the image sensor against the rails in the focal plane, the improvement wherein the rails include a plurality of alignment holes that are precisely located relative to the optical axis and the imager mounting plate includes a plurality of locating pins that locate into the corresponding holes in the rails to center the image sensor with respect to the optical axis at the focal plane.

2. A camera as claimed in claim 1 in which the alignment holes include two holes on one of the rails.

3. In a single lens reflex camera having a body component including an optical section arranged on an optical axis including a movable mirror for directing image light toward a viewfinder to form a viewfinder image and for focusing the image light upon a focal plane bounded by rails that define a reference for locating an imaging medium relative to the focal plane, the camera including an electronic image sensor and an imager mounting plate supporting the image sensor against the rails in the focal plane in order to obtain a captured image, the improvement wherein a plurality of alignment holes are precisely located on one or more of the rails relative to the optical axis and the imager mounting plate includes a plurality of locating pins that locate into the corresponding holes in the rails to center the image sensor with respect to the optical axis at the focal plane so that the captured image is centered with respect to the viewfinder image.

4. A camera as claimed in claim 3 in which the alignment holes include two holes on one of the rails.

* * * * *